No. 655,186. Patented Aug. 7, 1900.
H. A. BERTHEAU.
REAR COMPRESSION EXPLOSIVE ENGINE.
(Application filed July 20, 1898.)
(No Model.) 2 Sheets—Sheet 1.
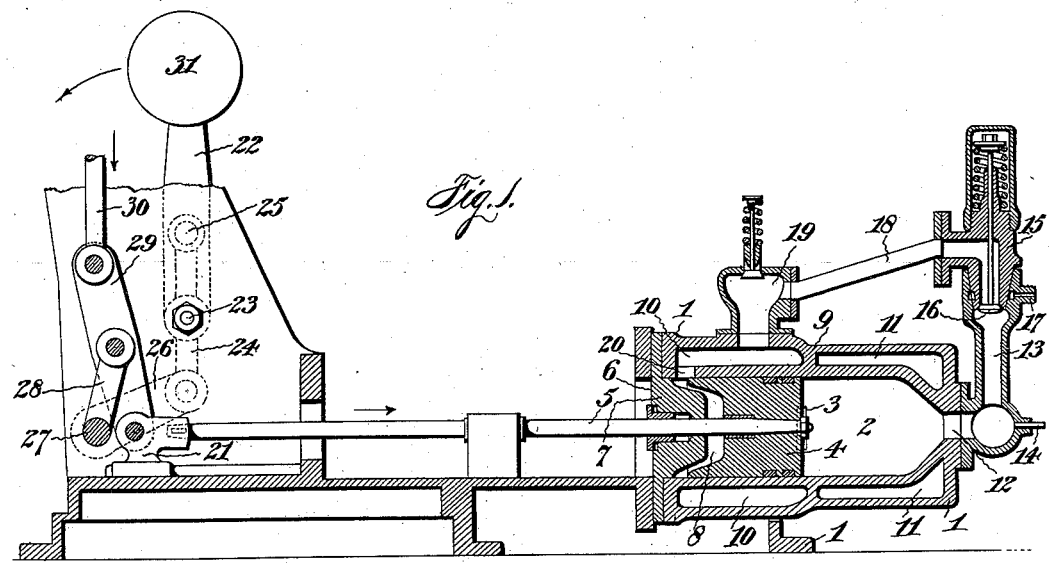
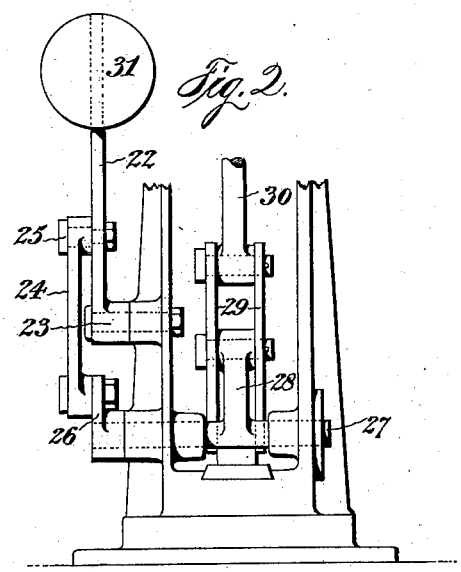
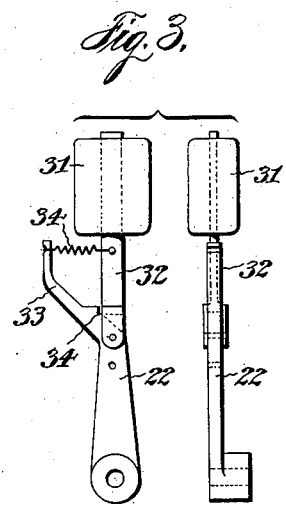

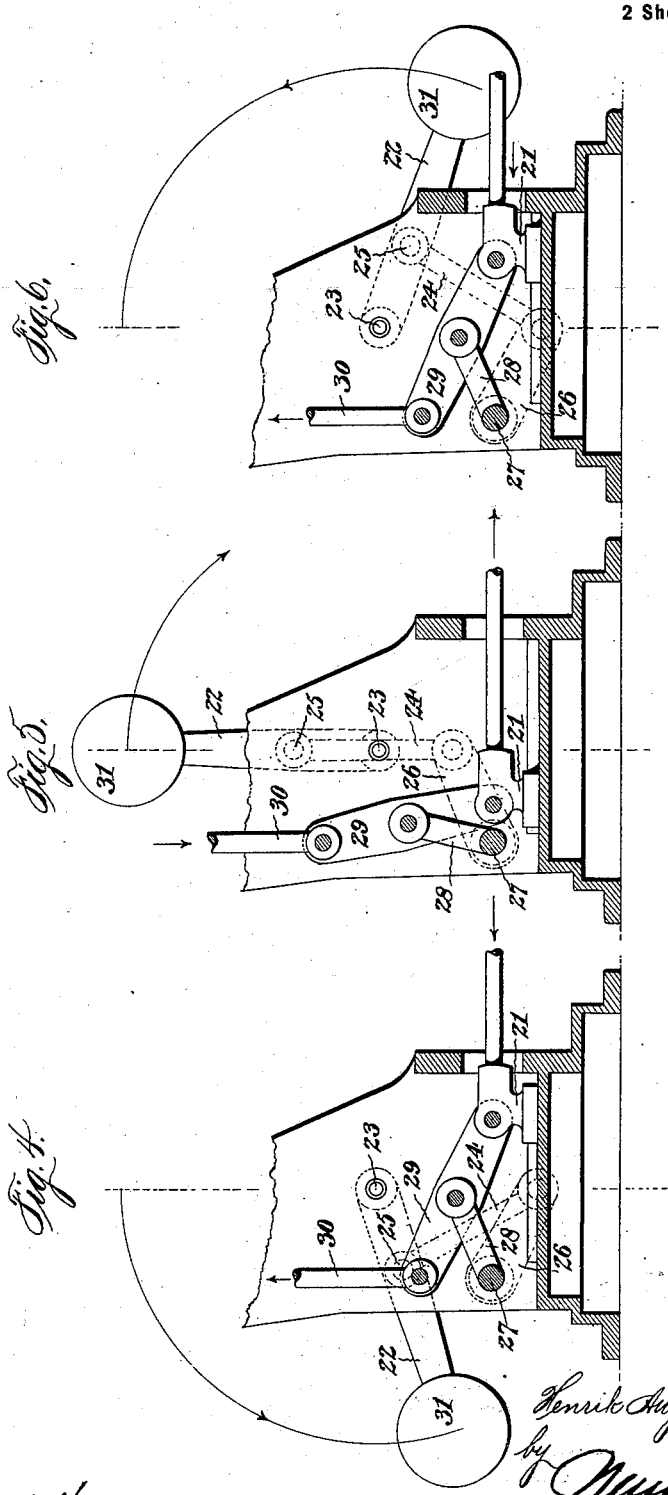

UNITED STATES PATENT OFFICE.

HENRIK AUGUST BERTHEAU, OF STOCKHOLM, SWEDEN.

REAR-COMPRESSION EXPLOSIVE-ENGINE.

SPECIFICATION forming part of Letters Patent No. 655,186, dated August 7, 1900.

Application filed July 20, 1898. Serial No. 686,441. (No model.)

*To all whom it may concern:*

Be it known that I, HENRIK AUGUST BERTHEAU, a subject of the King of Sweden and Norway, residing at Stockholm, in the Kingdom of Sweden, have invented certain new and useful Improvements in Compressors for Petroleum-Engines, of which the following is a specification.

The invention has relation to hydrocarbon or other like motive fluid motors; and it has for its object the provision of means whereby the forces acting upon the driven element and the forces exerted by said driven element upon the piston are balanced, or substantially so, so that the piston can be connected directly to an element which is to be reciprocated horizontally without the intervention of a crank-shaft and fly wheel or wheels.

The invention has for its further object the provision of means whereby the horizontal reciprocating movements of the piston may be converted into vertical reciprocating movements in a simple manner without the intervention of a crank-shaft and fly wheel or wheels; and said invention has for its further object other improvements whereby the efficiency of the motor is increased; but that my invention may be fully understood I will proceed to describe the same in detail, reference being had to the accompanying drawings, in which—

Figure 1 is a sectional view of so much of a hydrocarbon-engine, its compressor, and connected parts as will enable a full understanding of the invention. Fig. 2 is an end view of the compressor and mechanism for changing the direction of motion imparted by the piston; Fig. 3, a side and an end view of the compressor-arm. Figs. 4, 5, and 6 show various positions of the mechanism for converting the motion of the piston to one in a direction angular thereto.

1 is the motor-frame, 2 the power-cylinder provided midway of its length with an exhaust-port 3, and 4 the piston beginning its compression stroke, having connected to it a piston-rod 5. The cylinder-head 6 has an inwardly-projecting conical boss 7, the piston 4 having in its outer face a corresponding recess or cavity 8 approximately fitting said boss 7. The power-cylinder 2 is jacketed, the space surrounding said cylinder being divided by partition 9, dividing the jacket into two chambers 10 and 11, the inner one, 11, surrounding the hotter part of the cylinder, designed for the circulation of a cooling medium, and the outer one, 10, for heating the air used by the engine.

In the inner cylinder-head is formed a passage 12, leading to the lower enlarged portion of the feed-pipe 13, in which enlarged portion and in line with the axis of the cylinder is arranged the hot-tube 14 for igniting the explosive charge. The feed-pipe 13 is connected to a valve-casing 15, the loaded valve 16 of which opens downwardly. The hydrocarbon-feed 17 and air branch 18 enter above the valve-seat, while the branch 18 is connected with an air-chamber 19, provided with a spring-held valve for the entrance of air and communicating with the jacket-space 10 and the latter with the cylinder and behind the piston through a port 20 near the outer cylinder-head.

The piston-rod 5 is connected with a cross-head 21, sliding in suitable ways in the frame 1. A weighted lever 22, which may also be of the form shown in Fig. 3, though not necessarily, is fulcrumed on a stud 23 and has one end of a link 24 pivoted at 25, a point located between the fulcrum 23 and the weight on the end of the lever, the other end of said link being pivoted to a radial arm 26 on a shaft 27, that has bearing in the frame 1. The shaft 27 carries a second radial arm 28, that is set at an angle to the arm 26, so that the two arms, with their shaft, form a bell-crank lever. The arm 28 is pivoted to a link or, as shown, a pair of links 29, one on each side of the arm 28 and about midway of said link, one end of which is pivoted to the cross-head 21 and the other end to the rod 30, moved at an angle to the piston-rod 5 for transmitting power to the driven part.

The weighted lever or arm 22 (shown in Fig. 3) can be used in place of a solid lever, wherein the weight 31 is fixed on a rod 32 hinged to the main arm 22, which carries a projecting auxiliary arm 33, between which and the rod 32 is a spring 34, the tension of which is sufficient to hold the rod against the shoulder 34 or in alinement with the arm 22. As the piston is about to reach the end of its stroke and the air-cushion is acting to stop its further motion the movement of the arm 22 is of course also stopped and aids the compression; but on the reverse swing the inertia of the weight is taken up by the spring 34, thus avoiding any shock to the connected parts. In Fig. 1 the piston is just starting its compression stroke, and the parts will move as indicated by the arrows, while Fig. 4 shows the position of the parts after compression has been completed and beginning the return stroke, the weight having been swung to the left of the vertical. Fig. 5 shows the compression stroke beginning and parts moving as indicated, and Fig. 6 shows compression completed and explosion just taking place, the weight 31 about to be lifted to vertical position again.

Having thus described my invention, what I claim as new therein, and desire to secure by Letters Patent, is—

1. In an explosive-fluid engine, the combination with the power-cylinder, its piston and piston-rod, of a weighted lever pivoted to a stationary part, a link connection between said weighted lever and piston-rod, whereby said lever acts, first on one side and then on the other side of its central position, to aid compression, substantially as described.

2. In a single-acting horizontal engine, the combination with the power-cylinder and its piston; of a weighted lever, and means organized to transmit the power exerted by said lever to the piston during its compression, said lever composed of two straight arms pivoted together, the outer arm carrying the weight and the inner arm provided with an abutment for said outer arm to maintain both arms in alinement, and a spring connection between the arms to hold them normally in alinement, for the purpose set forth.

3. In a single-acting horizontal explosive-fluid engine, the combination with the power-cylinder, its piston and piston-rod, of a weighted lever pivoted to a stationary element of the engine, a link adapted to limit the motion of said lever and support the same during the change of direction of motion and connected by means of a crank and intermediate link to said piston-rod, substantially as described.

4. In a single-acting horizontal explosive-fluid engine, its piston and piston-rod, the combination with the power-cylinder of a weighted lever pivoted to a stationary element of the engine, a link limiting the motion of said lever, and supporting it during the change of direction of motion, and connected by means of a crank and intermediate link to the piston-rod, said intermediate link adapted to transmit motion at right angles to the motion of said piston-rod, substantially as set forth.

5. In a gas-engine, the combination with the power-cylinder, the piston-rod, a weighted lever pivoted to a stationary part and a power-transmitting rod out of alinement with the piston-rod, a link connecting said power-transmitting rod and piston-rod, a second link connected to the weighted lever and a bell-crank having an arm connected to each link, substantially as described.

6. In a gas-engine, the combination with the power-cylinder, the piston-rod, a weighted lever pivoted to a stationary part, and a power-transmitting rod substantially at right angles to the piston-rod, a link connecting the two rods and out of alinement with both, a second link connected to the weighted lever, a shaft having two cranks set at an angle to one another, one of said cranks connected to the link attached to the weighted lever and the other connected to the link connecting the two rods and intermediate its ends, substantially as described.

In witness whereof I have hereunto set my hand in presence of two witnesses.

HENRIK AUGUST BERTHEAU.

Witnesses:
KONR. DAHLQVIST,
M. GENBERG.